March 26, 1940.  O. H. PADDOCK  2,194,612
APPARATUS FOR CASE HARDENING GLASS
Filed May 18, 1935  2 Sheets-Sheet 1
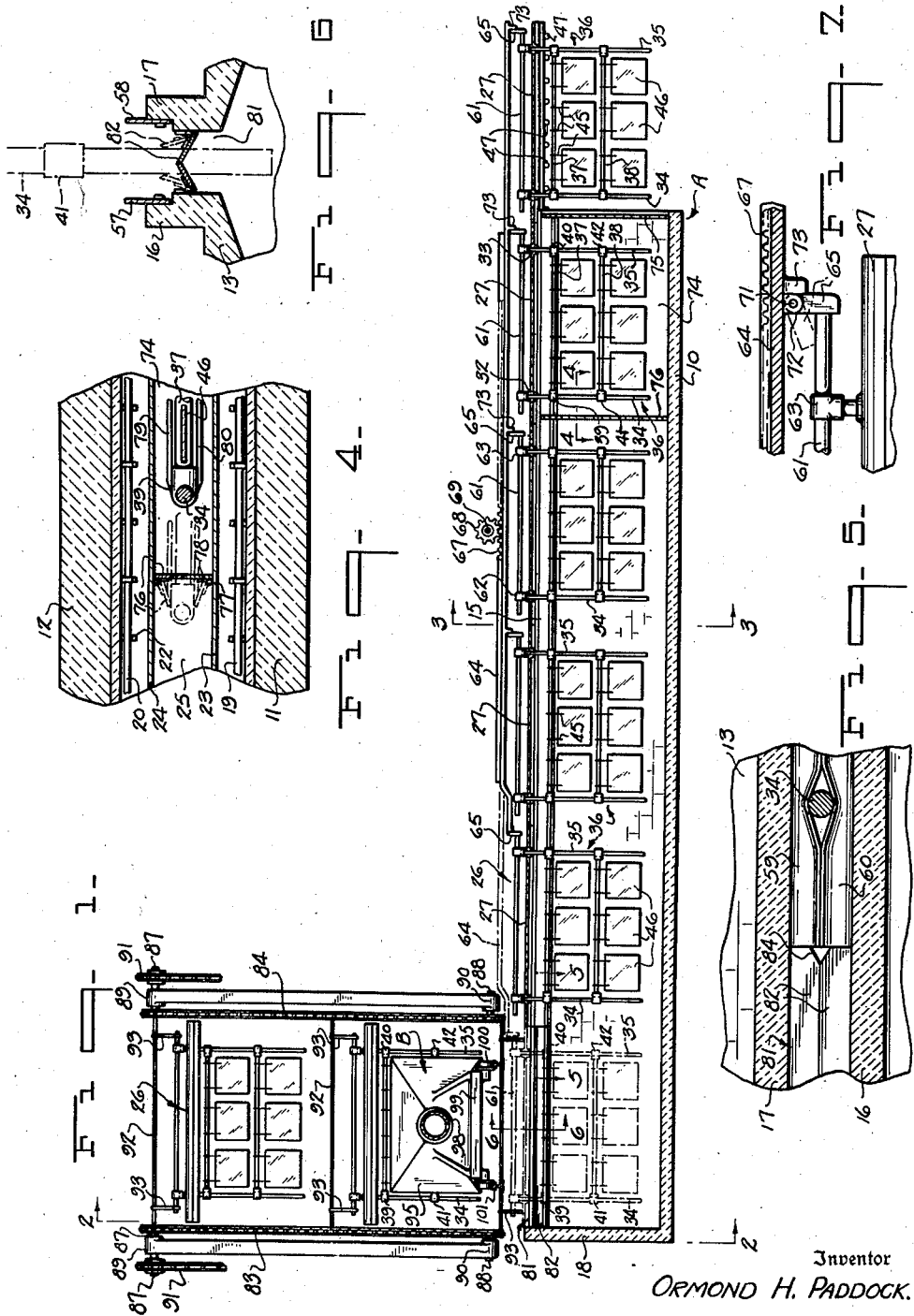
Inventor
ORMOND H. PADDOCK.
By Frank Fraser
Attorney

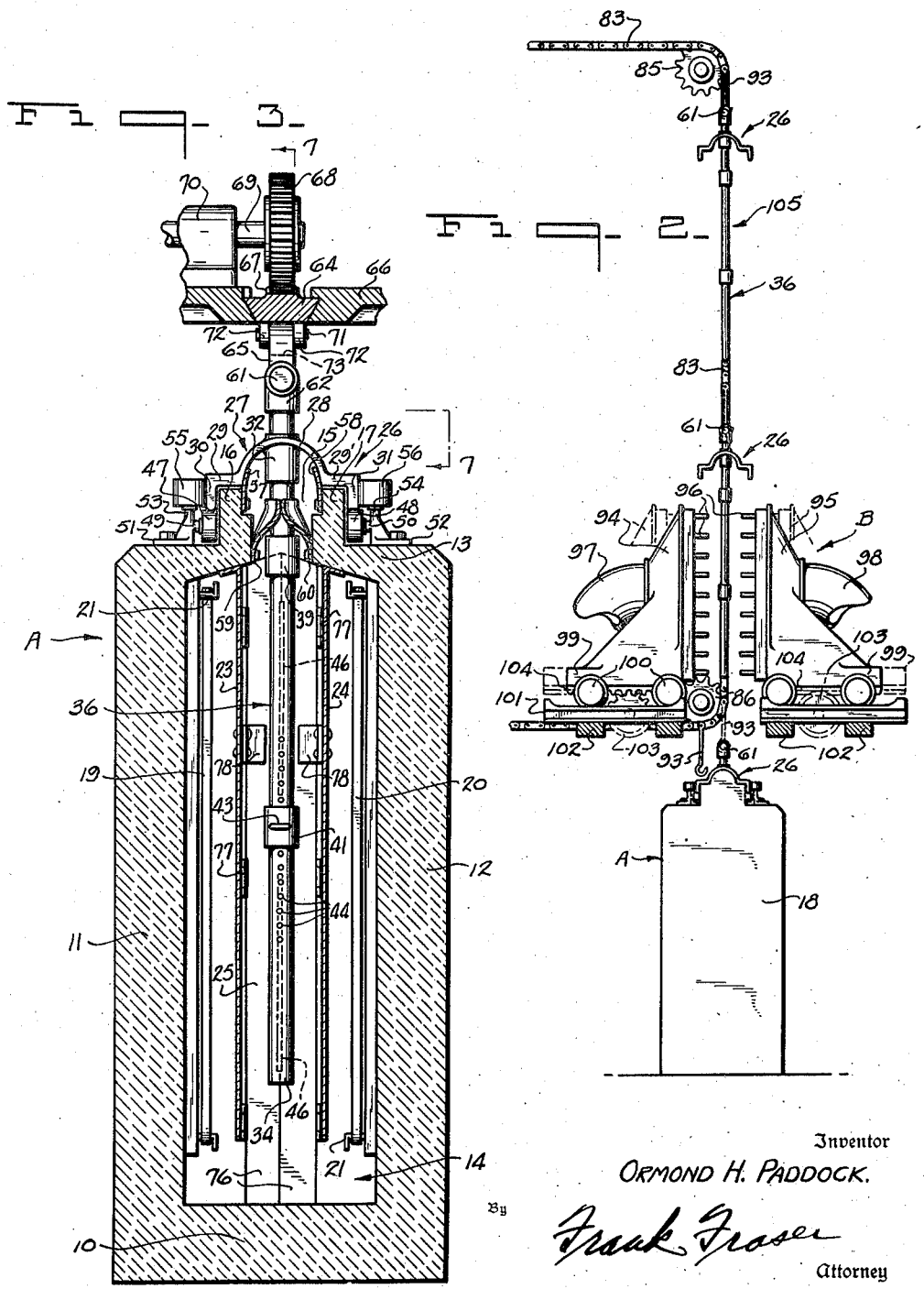

Patented Mar. 26, 1940

2,194,612

UNITED STATES PATENT OFFICE 2,194,612

APPARATUS FOR CASE HARDENING GLASS

Ormond H. Paddock, Rossford, Ohio, assignor to Libbey-Owens-Ford Glass Company, Toledo, Ohio, a corporation of Ohio Application May 18, 1935, Serial No. 22,195

4 Claims. (Cl. 49—45)

The present invention relates to the case hardening of glass and more particularly to improvements in apparatus for hardening or tempering glass sheets or plates in a continuous or semi-continuous manner.

Generally speaking, such hardening consists in first heating a sheet of glass to approximately its point of softening and in then rapidly chilling the same to place the outer surfaces of the sheet under compression and the interior thereof under tension. Glass sheets hardened in this manner have utility as a form of safety glass since the treatment thereof not only materially increases the mechanical strength of the glass but also changes the breaking characteristics of the sheet, in that when broken it will disintegrate into innumerable small and relatively harmless fragments instead of breaking into large, dangerous pieces or splinters as in the case of ordinary glass sheets.

It is an aim of this invention to provide a novel type of apparatus for effecting the case hardening of glass sheets or plates in a substantially continuous manner whereby a plurality of sheets or groups of sheets may be continuously maintained in progressively different stages of treatment and wherein the treatment of successive sheets or groups of sheets may be uniformly and accurately controlled.

According to the invention, the glass sheets or groups of sheets to be treated are introduced into one end of a suitable heating furnace, preferably of the tunnel type, and subsequently intermittently advanced therethrough at regular, predetermined intervals to the opposite end thereof. The temperature within the furnace and the movement of the glass sheets therethrough are so regulated and controlled that during the travel of the sheets by successive stages from the entrance to the discharge end of the furnace they will be gradually heated to approximately the point of softening of the glass.

As the properly heated glass sheets reach the discharge end of the furnace, they are successively transferred therefrom to a suitable cooling means where they are rapidly chilled. Upon the removal of heated glass sheets from the furnace, the sheets remaining therein and which are in different stages of heating, are advanced one stage forward and simultaneously fresh sheets to be treated are introduced into the entrance end of the furnace to compensate for those removed from the discharge end so that the furnace will be filled at all times.

With this arrangement and method of operation, a plurality of glass sheets or groups of sheets in progressively different stages of hardening are being continually treated and it is possible to satisfactorily case harden large numbers of sheets on a commercial scale, in a highly efficient manner and with a relatively small amount of apparatus.

Further objects and advantages of this invention will become more apparent during the course of the following description when taken in connection with the accompanying drawings.

In the drawings wherein like numerals are employed to designate like parts throughout the same, Fig. 1 is a longitudinal vertical section through apparatus constructed in accordance with the present invention, Fig. 2 is an end view thereof, Fig. 3 is a transverse vertical section taken substantially on line 3—3 of Fig. 1, Fig. 4 is a fragmentary section taken substantially on line 4—4 of Fig. 1, Fig. 5 is a fragmentary section taken substantially on line 5—5 of Fig. 1, Fig. 6 is a fragmentary section taken substantially on line 6—6 of Fig. 1, and Fig. 7 is a fragmentary section taken substantially on line 7—7 of Fig. 3.

Referring now more particularly to the drawings, the apparatus herein provided includes a longitudinally extending furnace of tunnel construction, designated in its entirety by the letter A, and within which the glass sheets to be hardened are adapted to be heated. Associated with the discharge end of the furnace is a suitable cooling means B adapted to receive the heated glass sheets from the furnace and to effect the desired cooling thereof. The cooling means B is preferably positioned directly above the furnace A, as shown, to permit the heated glass sheets to be readily transferred from the latter to the former.

The furnace A comprises a bottom 10, spaced vertical side walls 11 and 12, and a top 13, suitably connected together to enclose an elongated heating chamber 14. The top 13 of the furnace is formed with a longitudinally extending slot or opening 15, and arranged at opposite sides of said slot are spaced vertical flanges 16 and 17 defining the side walls thereof. The slot 15 and chamber 14 extend throughout the length of the furnace, terminating at the discharge end thereof against the end wall 18.

The furnace A is preferably provided with a muffled type of electric heating means which, as here shown, comprises series of resistance units 19 and 20 wound about insulators 21 and 22 and extending along the opposite side walls 11 and 12 respectively of said furnace. Baffle plates 23 and 24 are arranged in front of the units 19 and 20 being spaced from each other to provide a relatively narrow passageway 25 therebetween through which the glass sheets to be heated are passed. Suitable rheostats may be associated with the resistance units 19 and 20 to permit accurate and independent temperature control of the furnace throughout the length thereof.

Glass sheets to be hardened are adapted to be supported during treatment upon suitable carriages 26. Each of these carriages includes a casting 27 in the form of a channel iron or beam comprising an upwardly extending semicircular body portion 28 provided along its opposite side edges with outwardly extending horizontal webs 29 and 29' terminating in depending longitudinal flanges 30 and 31. Carried by the body portion 28 adjacent the opposite ends thereof are vertical sleeves 32 and 33 (Fig. 1) which receive and securely position a pair of vertical rods 34 and 35 respectively.

The vertical rods 34 and 35 are adapted to form the sides of a sheet carrying frame 36, which frame also includes upper and lower cross rods 37 and 38 respectively. The upper cross rod 37 is stationary, being rigidly secured to the side rods 34 and 35 by a pair of T fittings 39 and 40. The lower cross rod 38 is slightly connected to the rods 34 and 35 by similar fittings 41 and 42 and is adjustably secured relative to the upper cross rod by means of pins 43 passing through openings in the fittings 41 and 42 and adapted to engage spaced holes 44 in the said rods 34 and 35.

Suitable tongs or the like 45 may be hung from the cross rods 37 and 38 for the purpose of engaging and properly supporting the glass sheets 46. Although six sheets of substantially equal size have been shown on each of the carriages 26, it will be understood that a larger or smaller number of sheets of varying sizes might be readily mounted thereon by suitable adjustment of the lower cross rod 38 and proper positioning of the tongs 45.

During the travel of the glass sheets through the furnace, the sheet carrying frame 36 is adapted to be received within the passageway 25 while the carriage 26 is arranged above and outside of the furnace. The carriages 26 are movably supported above the furnace upon series of vertically disposed rollers 47 and 48 adapted to be engaged by the bottom edges of the depending flanges 30 and 31 respectively of the castings 27. The rollers 47 and 48 are arranged outwardly of the flanges 16 and 17 respectively and closely adjacent thereto, being rotatably mounted on horizontal stub shafts 49 and 50 carried by brackets 51 and 52 secured to the top 13 of the furnace. The brackets 51 and 52 are also provided with series of vertical stub shafts 53 and 54 upon which are rotatably mounted horizontal rollers 55 and 56 respectively adapted to engage the outer faces of the flanges 30 and 31 of the castings 27 to properly position and guide said carriages in their longitudinal movement.

With the carriages 26 supported in this manner it will be seen (Fig. 3) that the castings 27 will act as a closure for the slot or opening 15 and, while out of contact with the furnace, will cooperate with the flanges 16 and 17 to effectively prevent the escape of heated air from the passageway 25. The narrow spaces between the webs 29 and 29' and the top of the flanges 16 and 17 may be closed by strips 57 and 58 of asbestos or similar material fixed to the inner sides of the said flanges 16 and 17. In practice, when the furnace A is filled with carriages 26 as shown in Fig. 1, the castings 27 of adjacent carriages are adapted to abut one another to form a substantially complete closure for the slot or opening 15 throughout its length.

To further retard the escape of heat from the passageway 25, an auxiliary closure means is also provided within the slot 15. This auxiliary closure means comprises a pair of asbestos strips 59 and 60 secured to the inner faces of the flanges 16 and 17 adjacent the bottoms thereof and extending from the entrance end of the furnace to a point just short of the discharge opening 72 therein which is formed in the top of the furnace at the end remote from the entrance end thereof. The upper portions of the strips 59 and 60 are adapted to meet along the longitudinal center line of the furnace and to normally remain in engagement with one another to close the slot 15. These strips are preferably of such width and flexibility that they will tend to conform to the shape of the rods 34 and 35 of the carriages as they pass therebetween so that the openings in the auxiliary closure means caused by said rods will be relatively restricted (Fig. 5).

In order to facilitate movement of the carriages 26 along the furnace and their subsequent removal therefrom, there is provided a horizontal rod or handle member 61 mounted upon the upper ends of the vertical rods 34 and 35 of each carriage by means of a pair of T shaped fittings 62 and 63 respectively. The intermittent movement of the carriages 26 to convey the glass sheets 46 into and through the furnace is effected by means of a horizontally reciprocable bar 64 carrying a plurality of equally spaced, depending pusher members 65 adapted to engage the rear ends of the handle members 61. The pusher bar 64 is substantially rectangular in cross section (Fig. 3), having downwardly beveled edges and is slidably mounted in a similarly shaped channel formed in an overhead beam 66. Meshing with a rack 67 carried upon the upper side of the bar 65 is a pinion 68 keyed to the end of a drive shaft 69, said shaft being journaled in a bearing 70 and having driving connection with a reversible motor or other suitable drive means (not shown). Upon proper rotation of the pinion 68 at regular intervals the bar will be reciprocated to advance the carriages one step forwardly within the furnace.

The pusher members 65 are pivotally mounted upon transverse pins 71 carried by spaced ears 72 formed on the lower side of the bar 64. Depending projections 73 are also formed on the underside of the bar 64 directly behind each of the pusher members 65 in a manner to prevent rearward movement thereof while permitting them to swing freely in a forward direction. Thus, upon forward movement of the bar 64, the pusher members 65 will engage the handle members 61 to move each of the carriages 26 one step forward but on the return or rearward movement of the bar, the pusher members will slide freely over the top of the handle member of the following carriage until they drop behind the rearward end thereof.

A group of glass sheets to be treated are mounted on a carriage 26 and positioned exteriorly of the furnace preparatory to being introduced therein. For the purpose of supporting the carriage in this position, the series of rollers 47, 48 and 55, 56 may be continued out past the entrance end of the furnace as indicated at the right in Fig. 1. Thus, a carriage loaded with untreated glass sheets may be positioned on these rollers with the forward end of its casting 27 abutting the rear end of the last carriage within the furnace. When the pusher rod 64 is moved to advance the carriages 26 one step forwardly within the furnace, it will assume the position indicated by the dotted lines in Fig. 1. In addition to advancing each of the carriages within the furnace one step forward, it will simultaneously move the carriage outside of the furnace into the first or preheating compartment 74.

The preheating compartment 74 is in effect a normally closed chamber, being shut off from the outside atmosphere by a pair of spring pressed doors 75 and separated from the balance of the furnace by a second pair of similar doors 76. The individual doors of each of the pairs 75 and 76 are hinged as at 77 to the baffle plates 23 and 24 and extend outwardly therefrom to meet at the middle of the passageway 25, being normally maintained in closed position by the action of flat springs 78.

The pairs of doors 75 and 76 are operable upon movement of a sheet carrying frame 36 therethrough. For example, as a frame 36 is moved out of the compartment 74, the T fittings 39 and 41 thereon will contact the doors 76 and force them open against the action of the springs 78 just far enough to permit passage of the frame therethrough. In order to maintain the doors in open position and to protect the glass sheets from contact therewith, a pair of longitudinal buffer strips 79 and 80 extend between and are secured to the fittings 39 and 40 outwardly of the frame 36 (Fig. 4).

Within the preheating compartment 75 the temperature of the glass sheets is adapted to be raised to a point somewhat below the finally desired temperature but considerably above room temperature, for example to approximately 700 degrees Fahrenheit. For this reason and to insure the glass sheets being heated to the proper temperature before being advanced into the main portion of the furnace, it may be desirable to make the chamber 74 of sufficient size to accommodate two or more carriages depending upon the temperature within the preheating chamber and the speed of movement of the sheets therethrough.

From the preheating chamber 74, the glass sheets are intermittently advanced through successive stages within the furnace during which time the sheets are gradually and uniformly heated to the desired maximum temperature. The heating will be so controlled that when the glass sheets reach the discharge end of the furnace, they will have been heated to approximately the point of softening of the glass or in the neighborhood of 1250 degrees Fahrenheit and will then be ready to be transferred from the furnace to the cooling means B.

As explained above, the asbestos strips 59 and 60 do not extend over the discharge opening 81 of the furnace, said opening being preferably closed by a pair of horizontally arranged spring pressed doors 82 similar in construction and operation to the vertical doors 75 and 76. The doors 82 are normally closed and serve to take the place of the casting 27 when a carriage 26 has been removed from the discharge end of the furnace. However, upon movement of the next succeeding carriage to bring another group of sheets into the final heating stage, the doors 82 are adapted to be opened by the rod 34 of the carriage and to this end the meeting edges of the doors 82 are cut away at their forward ends to form a substantially V shaped notch which will facilitate the operative engagement of the rod 34 therewith.

The doors 82 are also operable into open position by the vertical rods 34 and 35 and the fixtures 39 to 42 upon vertical movement of a carriage from the discharge end of the furnace to the cooling means B. The rods 34 and 35 and the fixtures 39 to 42 are of such size that during vertical movement thereof the doors 82 will not come in contact with the glass sheets supported thereby.

With this arrangement, as the doors 82 are held open during upward movement of the glass sheets from the furnace to the cooling means, the heated air within the discharge end of the furnace will be permitted to escape therethrough. The doors 82 will act to direct the heated air rising from the furnace along the sides of the glass sheets to form a moving blanket of heated air on either side thereof during the transfer of the heated sheets from the furnace to the cooling means. This condition will be further assisted by the shape and position of the casting 27 of the carriage 26 which will act to retard the upward movement of the heated air beyond the area of the glass sheets supported therefrom.

The means for transferring the carriages 26 and the heated glass sheets carried thereby from the furnace to the cooling means comprises, as here shown, a pair of spaced endless chains 83 and 84. Each of these chains is trained about a pair of vertically aligned sprockets 85 and 86, keyed to shafts 87 and 88 respectively, journaled in suitable bearings 89 and 90. The chains 83 and 84 are preferably also trained about additional sprockets (not shown) and may be driven from the upper shafts 87, the outer ends of which are connected by means of a chain and sprocket drive 91 to any suitable source of power.

Mounted at equal intervals throughout the length of the chains 83 and 84 and extending therebetween are a plurality of horizontally arranged lifting rods 92 which carry, adjacent their outer ends, loosely mounted hook members 93 adapted to engage the handle members 61 of the carriages 26 outwardly of the fittings 62 and 63. As clearly shown in Figs. 1 and 2, upon upward movement of the chains 83 and 84 in their vertical run, a pair of the hooks 93 will engage the handle member 61 of the carriage at the discharge end of the furnace and move it upwardly to bring the glass sheets supported thereon into proper position relative to the cooling means B.

Although the present invention is not limited to any particular type of cooling means, the cooling apparatus B illustrated in the drawings comprises a pair of spaced oppositely disposed blower heads 94 and 95. The opposing faces of these blower heads are provided with a plurality of uniformly spaced nipples 96 through which compressed air, supplied to the heads through flexible conduits 97 and 98, may be discharged upon opposite surfaces of the glass sheets. Each of the blower heads 94 and 95 is mounted upon a carriage 99 provided with wheels 100 to run on track sections 101 supported upon cross beams 75

102. During the cooling of the glass sheets, the blower heads 94 and 95 are moved inwardly to the position shown in full lines in Fig. 2. However, upon lifting of the glass sheets from the furnace, the blower heads are moved outwardly to the position indicated by the broken lines to permit the passage of the supporting carriage 26 therebetween. This inward and outward movement of the blower heads may be effected by means of pinions 103 connected with suitable driving means (not shown) and adapted to mesh with racks 104 fixed to the bottom of each of the carriages 99.

When a group of glass sheets have been brought into cooling position between the blower heads 94 and 95 and the heads advanced into operative or full line position, the glass sheets will be rapidly chilled by blasts or jets of air directed onto both sides thereof simultaneously through the nipples 96. The blower heads may be maintained stationary or caused to oscillate or otherwise move in the plane of the sheets.

Upon the next succeeding movement of the chains 83 and 84 to bring another group of sheets into cooling position, the first carriage will be moved upwardly beyond the cooling means B as at 105. The hardened sheets may be removed at this point or the carriage permitted to travel with subsequent movements of the chains until it reaches any desired position along the upper horizontal run.

In operation, groups of glass sheets 46 supported upon carriages 26 are intermittently advanced at regular predetermined intervals into and through the furnace A by means of the pusher bar 64. The movement of the carriages will be so timed and the temperature throughout the furnace so controlled that as the sheets pass therethrough they will be gradually and uniformly heated from room temperature to approximately the point of softening of the glass.

Groups of properly heated glass sheets will be periodically transferred from the discharge end of the furnace A to the cooling means B upon movement of the chains 83 and 84 to cause the hook members 93 to engage the ends of the handle member 61 of one of the supporting carriages 26 and thus elevate the carriage into cooling position. The glass sheets will then be rapidly chilled by jets of air directed onto both sides simultaneously from the blower heads 96 and 97, to place the outer surfaces of the sheets under compression and the interiors thereof under tension. Upon succeeding movements of the chains 83 and 84, the carriage 26 supporting the hardened glass sheets will be advanced into unloading position.

If desired, this apparatus may be rendered almost entirely automatic by the provision of suitable limit switches or the like to properly synchronize the movements of the pusher bar 64 and the chains 83 and 84.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the case hardening of glass sheets, a tunnel type furnace for receiving the sheets to be treated, heating means therefor, a continuous opening in the top of said furnace, a plurality of carriages movably mounted upon said furnace exteriorly thereof and shaped to cooperate with one another to substantially close said opening, means connected to said carriages and extending through said opening for supporting glass sheets within the furnace, flexible auxiliary closure means for said opening positioned beneath said carriages, and means for advancing said carriages to move the glass sheets through the furnace.

2. In apparatus for use in the case hardening of glass sheets wherein the sheets are first heated and then suddenly cooled, a tunnel type furnace for receiving the sheets to be treated, heating means therefor, a carriage mounted for movement along said furnace exteriorly thereof and from which glass sheets are supported within the furnace, a handle member mounted on said carriage, means engageable with said handle member for advancing the carriage to convey the glass sheets through the furnace, and means subsequently engageable with said handle member for moving said sheet supporting carriage from the furnace out of longitudinal alignment therewith and into position for cooling.

3. In apparatus for use in the case hardening of glass sheets wherein the sheets are first heated and then suddenly cooled, a tunnel type furnace for receiving the sheets to be treated, heating means therefor, a carriage mounted for movement along said furnace exteriorly thereof and from which glass sheets are supported within the furnace, a handle member mounted on said carriage, an actuating bar, a series of actuating members associated with said bar and adapted to successively engage the handle member for intermittently advancing said carriage to convey the glass sheets through the furnace, and means adapted to engage said handle member when the carriage reaches the discharge end of the furnace to move said sheet supporting carriage from the furnace out of longitudinal alignment therewith and into position for cooling.

4. In apparatus for use in the case hardening of glass sheets wherein the sheets are first heated and then suddenly cooled, a tunnel type furnace for receiving the sheets to be treated, heating means therefor, a carriage mounted for movement along said furnace exteriorly thereof and from which glass sheets are supported within the furnace, means for advancing said carriage to convey the sheets through the furnace, and means for moving said sheets from the furnace out of longitudinal alignment therewith and into position for cooling comprising an endless conveyor, drive means therefor and means associated with said conveyor and engageable with the carriage for moving said sheet supporting carriage from the furnace into position for cooling.

ORMOND H. PADDOCK.